FIG_1

FIG_2

FIG_3

FIG_4

FIG_5a

FIG_5b

FIG_6

FIG_7a

FIG_7b

FIG_7c

FIG_7d

FIG_7e

FIG_7f

FIG_7g

FIG_7h

FIG_7i

FIG_9

FIG_10

} FIG_11

FIG_12

INVENTOR.
GERALD L. PRESSMAN
BY
Townsend and Townsend
ATTORNEYS

United States Patent Office 3,694,200
Patented Sept. 26, 1972

3,694,200
ELECTROSTATIC MODULATOR FOR CONTROL-
LING FLOW OF CHARGED PARTICLES
Gerald L. Pressman, San Jose, Calif., assignor to
Electroprint, Inc., Palo Alto, Calif.
Filed Oct. 29, 1970, Ser. No. 85,070
Int. Cl. G03g 5/00, 13/00
U.S. Cl. 96—1 R                          8 Claims

ABSTRACT OF THE DISCLOSURE

A system for controlling the flow of charged particles and for modulated aperture electrostatic printing. An apertured screen having substantially the entire surfaces formed of a dielectric material is charged with like charges over substantially all its surfaces to develop fringing fields in the apertures. The charge distributed across one side of the screen is selectively dissipated in accordance with a pattern to be reproduced thereby establishing a bipolar electrostatic latent image as a modification of the fringing fields for density control of a flow of charged particles directed through the screen. The screen may be formed with dielectric thicker on one face than the other to initially carry a higher potential and provide a uniform charge inequality or potential difference through the screen apertures, oriented to enhance the flow of charged particles through the screen. Full modulation control of particle flow is therefore possible with a single selective charge dissipation. For electrostatic reproduction a print-receiving medium is interposed in the modulated particle flow passing through the screen.

---

This invention relates to a new and improved system for modulated aperture electrostatic printing and more generally to an electrostatic modulator for controlling the flow of charged particles.

In conventional xerography, a xerographic plate formed of a layer of photoconductive insulating material coated on a conductive surface is used for establishing and supporting electrostatic latent images. The xerographic plate is electrostatically charged uniformly over its surface and a light pattern corresponding to the image to be reproduced is projected on the plate to selectively dissipate the charge. The resultant latent electrostatic image is developed by powdering with toner particles which are electrostatically attracted to the xerographic plate in a pattern defined by the charge distribution of the electrostatic image. The powder image is thereafter contact transferred to a sheet of paper or other print-receiving medium. Because of interfering electrostatic lines of force established in the latent image, the field lines of force concentrate at the edges of the latent image resulting in reproduction having hollow centers and emphasized edges.

These problems are overcome in the apparatus and method described in the McFarlane Pats. 3,339,469 and 3,220,833 wherein the electrostatic latent image is first formed on a screen or interrupted grid of conductive material coated with an insulative photoconductive material. Developing ink toner may be, in one embodiment, clouded onto the electrostatic latent image by filtering the toner particles through the screen or grid mesh onto the charged boundaries of the interstices of the screen in accordance with the charge pattern. The developed toner image is thereafter transferred by projection of the particles along lines of an overall applied electrostatic force field across a space to a print-receiving medium or other transfer medium. The expedience of non-contact printing, and fine control over the electrostatic latent image charge distribution provided by the interrupted surface of the screen which supports the image, overcome many of the problems of conventional xerography.

Improvements on the McFarlane system are described in the Pressman patent application Ser. No. 673,499, now U.S. Pat. No. 3,625,604, and the Pressman and Kittredge patent application Ser. No. 776,146, now U.S. Pat. No. 3,647,291.

According to these disclosures, there is provided in a preferred embodiment a multi-layered apertured screen including at least a conductive layer and an adjacent insulative layer on which on electrostatic latent image is formed for modulating the flow of charged toner particles or other printing particles directed through the apertures of the screen by an accelerating field. A two-layer screen construction permits the establishing of a double layer charge on the opposite sides of an insulative layer for selectively producing overlapping lines of force or "fringing" fields within the apertures of the screen. Thus, lines of force generated by bipolar electrostatic fields extend within apertures of the screen and can be oriented to oppose the passage of charged particles, enhance the flow of charged particles, or be neutralized to have no effect on charged particles directed through the screen. Thus, the double layer charge can be selectively established across the face of the screen to substantially completely block the passage of charged particles through certain apertures, enhance and accelerate the passage of charged particles through other apertures, and control the width and density of the particle stream through other apertures along a continuous range in between. A stream or flow of charged particles directed through the screen by an accelerating field is therefore modulated to provide a cross-sectional density variation at least substantially corresponding with the image to be reproduced. The modulated stream of toner particles or other charged particles is transferred by the overall applied electrostatic projection field across a gap to a print-receiving medium and the powder image is thereafter fixed according to known techniques.

In one approach for establishing the double charge layer electrostatic latent image across the screen, a substantially uniform charge distribution may be initially established across both sides of the insulative layer with opposite charges on the respective sides to provide fringing fields within the apertures. These fringing fields include blocking fields to block or partially block particles of a predetermined sign. By use of photosensitive materials the charge distribution and therefore the blocking fields are dissipated according to a light pattern projected on the screen. The fringing fields also may include enhancing fields which are established by additional techniques. The screen must generally be charged initially with blocking fields which block the passage of charged toner particles through the screen. The blocking fields are thereafter selectively neutralized according to the light pattern or reversed to enhancing fields according to additional procedures, and the resulting modulation of the flow of toner particles through the screen results in negative printing. In order to achieve positive printing, special contact charging techniques and other expedients are used.

The present invention is characterized in that it improves, by shortening, the charging time required for establishing an initial uniform charge across a screen, as for example when using corona charging devices. The invention also enables readily the establishing directly of the charge pattern for the modulator, particularly for positive type printing.

It is therefore an object of the present invention to provide an improved modulated aperture electrostatic non-contact printing system which permits direct positive printing with an electrostatic screen modulator which controls the density flow of charged particles directed through the screen.

Another object of the invention is to provide an electrostatic screen modulator for supporting a double charge layer electrostatic latent image and which can be charged to high voltages at desired levels in short periods of time.

A further object of the invention is to provide an electrostatic screen modulator for supporting a double charge layer electrostatic latent image in which the selective charge distribution can be established by simple light protection techniques to provide both blocking and enhancing fields and fields along a continuous range in between for controlling the flow of charged particles directed through the screen by an accelerating field.

Another object is the provision of the screen modulator capable of produicng enhancing through blocking field control from single sign charge while enabling positive or negative printing in electrostatic printing applications.

A still further object is the provision of a unique method for electrostatic latent image modulation control and particularly for control of electrostatic printing processes.

In order to accomplish these results, the present invention contemplates providing an apertured screen having substantially the entire surafces formed of an insulative dielectric material. The insulative material of the screen is charged over substantially the entire surfaces of the screen with like charges to produce double charged insulation material. The charge across one side face of the screen is thereafter selectively dissipated in accordance with a pattern to be reproduced, thereby establishing a double layer electrostatic latent image. The screen can be incorporated in an electrostatic printer which provides an overall electrostatic accelerating field for directing charged particles through the screen, which modulates the particle flow. The modulated particle flow passing through the screen may be caused to impact a spaced print-receiving medium where it can be fixed (if the particles are of certain marking materials) according to known techniques.

The charges can initially be distributed on both faces of the apertured screen to provide two-charge layers of substantially equal sign and potential so that lines of force do not pass through the apertures of the screen. The screen is therefore passive to a flow of charged particles directed through the screen by an overall applied accelerating field. Upon selective dissipation of the charge across one side of the screen in accordance with a pattern to be reproduced, the resulting charge inequality establishes electrostatic lines of force within the aperture of the screen to selectively block charged particles of one sign according to the magnitude and distribution of the charge inequality and potential difference between the layers.

The invention also contemplates providing an apertured screen formed with insulative material over its entire surfaces and also formed with the insulative material thicker on one side of the screen than on the other whereby a greater potential can be established on one side or face of the screen than the other. The resulting uniform charge inequality (uniform across the face but unequal in the direction of the flight) across the face of the screen thereby establishes uniformly oriented electrostatic lines of force through the apertures of the screen which can be oriented to enhance the flow of a stream of charged particles directed through the screen. The charge distributed on the side or face of the screen having the greater charge density is thereafter selectively dissipated in accordance with the pattern to be reproduced thereby to weaken, neutralize, and even reverse the lines of force extending through the apertures of the screen according to the inequality between the charges across the respective sides of the screen. Thus, an initially uniform array of enhancing fields can be selectively weakened, neutralized, and reversed to form a distribution of enhancing fields, neutral fields and blocking fields in accordance with a pattern to be reproduced. The resulting double charge layer electrostatic latent image is referred to herein as a bipolar electrostatic latent image. It may now be appreciated that, in the absence of any variation in the thickness of the insulative material, the bipolar electrostatic fields developed by charging the insulative layers is the sole modulating control relative to the accelerating field.

When the insulative material is thickened to retain a higher charge than the associated thinner insulative material, additionally the like potential difference fields may be developed with their useful lines of force, i.e. in the direction of or opposed to particle flight, and oriented parallel with the lines of force of the bipolar fields for each given aperture and these lines of force produced by the like potential fields may aid, neutralize, or overcome and reverse the effective flux in the apertures. But it must be realized that the like potential difference fields lines of flux cannot exist without some bipolar field being present nor without the uneven distribution of insulative material. Thus the initial charging may, by way of example, place a 500 volt potential difference between the screen conductor and the outermost surfaces of the thickest portion of insulative material. Similarly the field from the face of the screen measured from the outside of the thickest insulation through an aperture to the opposite face along the insulative surface may also vary from 500 to 0 volts, the first field being the bipolar field and the latter field being the like potential difference field. In actual practice innumerable variations of these figures will be encountered in accordance with the various degrees of enhancing through blocking manifested by the individual apertures.

Thus, according to one general aspect the invention contemplates the method of establishing a substantially coplanar array of a plurality of bipolar electrostatic fields having lines of force generally parallel to the flow of charged particles to be controlled and orienting the bipolar electrostatic fields to enhance the charged particle screen flow. Additionally, like potential difference fields are established in directions further to enhance the effects of the bipolar electrostatic fields. The invention further contemplates selectively reducing, neutralizing, and reversing the bipolar electrostatic fields according to a pattern to be reproduced thereby establishing a bipolar electrostatic latent image for modulating the charged particle screen flow density. The reducing, neutralizing, and reversing of the bipolar electrostatic fields is effective in the region of increased thickness of insulation material but is progressively less effective in the apertures so that the relative effects above stated are obtained. Thus, selectively across the screen the bipolar fields are reduced in magnitude relative to the like potential difference fields usually by light pattern to effect the modulation.

In a preferred form of the invention the bipolar electrostatic latent image is supported on an electrostatic screen modular comprising a conductive apertured screen having a layer of insulative material coated on one side thereof and on the inner surfaces defining the screen apertures, and having a layer of photoconductive material coated on the other side thereof so that the entire screen surfaces are coated with insulative material. The photoconductive insulative material is coated to a greater thickness than the insulative material coated on the inner surfaces of the apertures and on the other side of the screen so that a greater potential can initially be established on the side of the screen coated with the photoconductive material by charging from a single sign course. With the conductive screen core connected to a fixed potential such as ground, a light image is projected on the photoconductive side of the screen thereby to selectively dissipate the initially uniform charge distribution in proportion to the intensity of the incident light. The result is a bipolar electrostatic latent image of overlapping or fringing force fields within the apertures of the screen for modulating the flow of toner particles directed through the screen. The arrangement of the electrostatic screen modulator permits enhancing lines of force or no lines of force to be established within the apertures corresponding to the dark portions of a projected pattern to be reproduced. At the same time, blocking lines of force of variable strength are established within the apertures of the screen corresponding to regions of variable lightness intensity of the projected pattern to be reproduced. The resultant feature and advantage is that direct, positive electrostatic printing is obtained with modulation of a stream of charged dark toner particles by means of an apertured screen supporting a bipolar electrostatic latent image.

Another feature and advantage of the embodiment of the present invention in which the conductive screen surfaces are entirely coated with insulative material so that no conductive surfaces are exposed is that a high voltage charge can be established on the screen in a short period of time using, for example, corona charging currents. It has been found in some prior modulated aperture electrostatic screens comprising adjacent layers of conductive and insulative material that the exposed conductive surfaces tend to draw off the corona charging current as soon as a relatively low voltage charge has been established on the insulative material. Thus, at a low voltage charge level leakage through the conductive layer balances the incoming corona current flow so that no increase in potential is obtained. The present invention contemplates a screen having its entire surfaces formed of an insulative material so that a charge voltage approaching that of a flat dielectric surface can be obtained using corona charging techniques.

The invention also contemplates directly establishing an electrostatic latent image on the screen modulator by, for example, contact charging methods.

Other objects, features and advantages of the present invention will become apparent in the following specification and accompanying drawings.

In the embodiment of the present invention illustrated in FIGS. 1 through 4, an electrostatic screen modulator 10 is constructed with a screen or mesh base 11 of metal or other conductive material. The metal screen base 11 is coated on one surface 12 of the screen and on the inside walls 13 of the screen apertures with a layer 14 of ordinary electrical insulator material, preferably having a high dielectric strength as well as high resistivity. The opposite surface 15 of the metal screen base 11 is coated with a layer 16 of a photoconductive insulating material.

Figure 1:
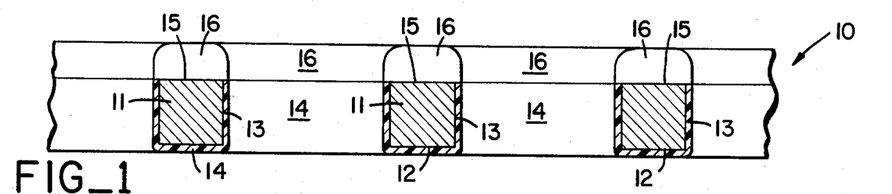
FIGS. 1 through 4 are end cross-sectional views of an electrostatic screen modulator according to the present invention.

In forming the screen, the metal screen base 11 is first coated with the layer 14 of insulator material along one surface 12 of the screen and on the inside walls 13 defining the apertures or holes through the screen. The insulator material can be applied, for example, by spraying the screen from one side. This may result in some deposition of the insulator material 14 on the opposite surface 15 of the screen. Such material can be removed by rubbing the surface 15 with abrasive material after the screen has been sprayed from one side. The photoconducting insulative material is then applied to the uncoated surface 15 of the screen. The photoconductor material is preferably applied so that coating of the internal walls of the screen holes is avoided, but a small degree of internal coating can be tolerated. Such selective coating of the surface 15 of the screen base 11 can be accomplished by electrostatic spraying of the photoconductive material after first charging the insulator layer 14 with charges similar to that applied to the photoconductive material 16. The photoconductor 16 is thereby repelled from the insulator surfaces 14 during deposition so that separation of the coatings 16 and 14 results. The entire surfaces of the metal screen base 11, however, are coated with an insulative layer, either 14 or 16.

Figure 2:
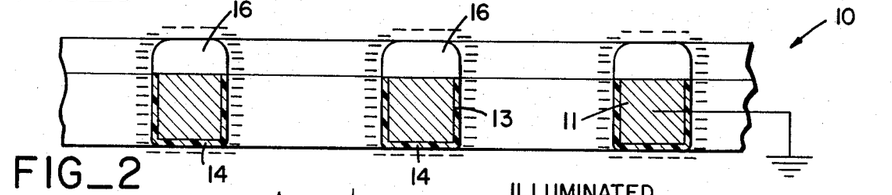
Figure 3:
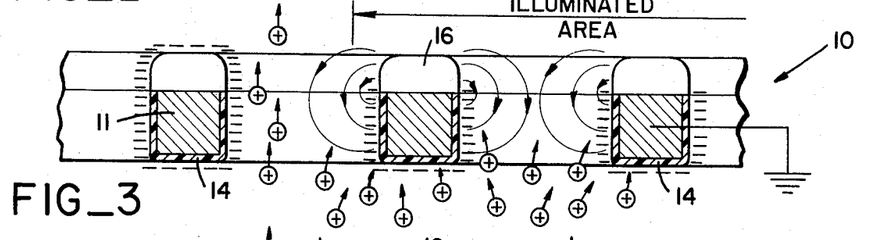

According to one mode of operation of the screen 10 shown in FIGS. 2 and 3, the screen is positioned so that the screen surface coated with insulator layer 14 faces a toner source or other source of charged particles. The modulator screen 10 is first charged uniformly over its entire surfaces so that the potentials on the insulator layer 14 and photoconductive layer 16 on opposite surfaces of the screen are approximately the same. In FIG. 2, a negative charge is shown by way of example and the conductive screen base 11 is maintained at a ground potential or at a selected fixed potential during the charging process. Charging of the surfaces of the modulator screen 10 is accomplished, for example, by corona discharge currents from a corona spray source or corona wand. As a result of the uniform charge distribution across the surfaces of the screen, there are no potential differences across the screen and no fringing fields or lines of force extend axially through the holes in the screen, as shown in the charge configuration of FIG. 2. A bipolar electrostatic latent image corresponding to a pattern to be reproduced is thereafter established by selectively dissipating the charges deposited on the photoconductive layer 16. Selective dissipation of the charge layer on the photoconductive material 16 is accomplished by projecting on the screen 10 and illuminating the photoconductive layer 16 with light in the pattern of the image to be reproduced while the conductive screen base 11 is maintained at a fixed potential or ground potential as shown in FIG. 3. The negative charges initially deposited on the photoconductive material 16 are selectively conducted away in the regions illuminated with light, the photoconductor potential approaching the potential of the conductive screen 11 in the illuminated regions. As a result of the selective charge dissipation, a charge inequality of varying magnitude is established across the surfaces of the screen, thereby producing fringing fields of electrostatic lines of force axially through the screen apertures or holes in the illuminated portions of the screen. As shown in FIG. 3, the fringing fields of force within the apertures act to block or attenuate the passage of positively charged toner particles directed towards the screen. The initial flow of charged particles, such as charged toner particles, is created by an overall applied electrostatic accelerating field in which the modulator screen is interposed to modulate the established flow of charged toner particles. In the non-illuminated portions of the screen, the absence of force fields within the apertures renders those portions of the screen passive to the charged toner particle flow thereby permitting passage of the toner as also shown in FIG. 3. The strength of the fringing force fields established within the apertures of the screen is proportional to the extent of charge dissipation from the photoconductive layer 16 which is in turn proportional to the extent of light illumination. The apertures of the screen thereby permit a modulated control over the flow of charged particles along a continuous range from passing to completely blocking the flow of charged particles in any particular aperture.

Figure 4:
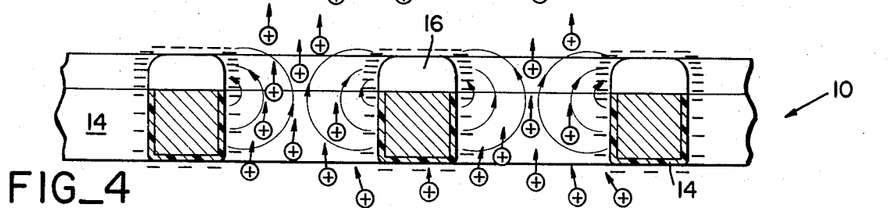

The potentials acquired by the two components of the screen coating during charging are determined principally by the dielectric strength, thickness, and resistivities of the materials comprising the coatings. In some applications it is advantageous to form the screen so that the potential acquired by the photoconductive insulator layer is higher in absolute value than that acquired by the ordinary insulator. As a general rule, this can be accomplished by forming the insulative layer thicker on one side of the screen than on the other. This, however, may also depend upon the charge carrying capacities of the respective materials. Thus, according to another embodiment of the present invention, the photoconducting insulative coating is formed thicker than the ordinary insulative coating formed on the other side of the screen. Under these circumstances and as shown in FIG. 4, a greater quantity of charge can be acquired on the photoconductive surface of the screen than on the opposite surface, thereby establishing a uniform charge inequality across the face of the screen or at least along the wall or reaches of the apertures. The resulting fringing fields of force established within the screen apertures are oriented to provide "enhancing fields" or accelerating fields in this example with respect to positive toners. The enhancing fields increase the flow of positively charged toner particles through the portions of the screen corresponding to dark areas which have not been illuminated, improving the printing density in these areas. Thus, as shown in FIG. 4, a flow of positively charged particles, such as charged toner particles established by an overall applied accelerating electrosatic field, are further accelerated and enhanced in the apertures of the screen by the fringing force fields. Illumination of portions of the screen by a light pattern as heretofore described, with the metal screen base 11 maintained at a fixed potential, results in selective dissipation of the charge deposited on the photoconductive layer 16 weakening the enhancing field in some regions, neutralizing or eliminating the fringing fields of force in other apertures, and reversing the bipolar electrostatic fields in other apertures, to produce blocking fields of variable strength. Thus, a bipolar electrostatic latent image, containing established force fields within the apertures ranging from enhancing to blocking, is established in accordance with an image to be reproduced.

In the embodiments of the present invention illustrated in FIGS. 1 through 4, the metal or other conductive screen base is coated over its entire surfaces with insulative material, either ordinary insulating material or photoconductive insulating material. The insulative coatings can be applied to a variety of conductive screens such as, for example, etched metal or woven wire screens, and in a variety of configurations as illustrated in the examples of FIGS. 7a through 7i.

Figure 7A:
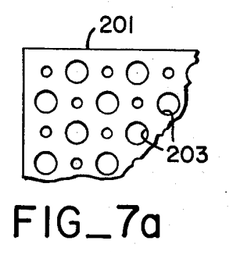
FIGS. 7a through 7i are fragmentary diagrammatic views of various screen configurations applicable in the present invention.
Figure 7B:
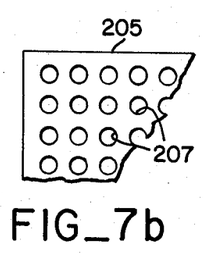
Figure 7C:
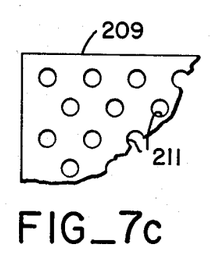
Figure 7D:
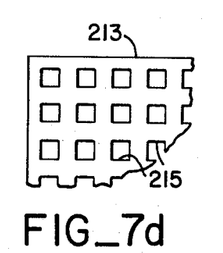
Figure 7E:
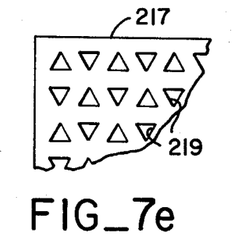
Figure 7F:
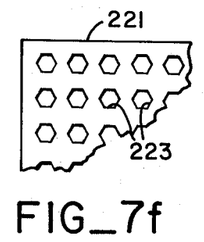
Figure 7G:
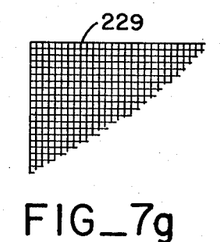
Figure 7H:
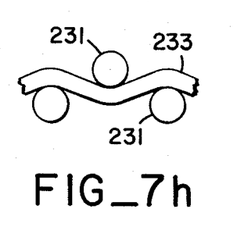

It should be noted that the screens described herein are not limited to any given shape, size, or distribution of apertures and may even contain apertures of varying size and/or shape and/or distribution even in a random fashion as shown in FIGS. 7a through 7h. In Screen 201 (FIG. 7a), apertures 203 are distributed in a random fashion and may have randomly distributed size and irregular shape as well. The screen 205 (FIG. 7b) consists of the uniform array of circular apertures 207 in essentially a square or 90 degree pattern. Alternately, the apertures 211 as shown in screen 209 (FIG. 7c) may be circular, arrayed in a uniform pattern of a triangular or 60 degree distribution. In screen 213 (FIG. 7d), the apertures 215 are square and arrayed in a square or 90 degree pattern, in screen 217 (FIG. 7e), the apertures consist of triangular holes 219 arrayed in alternating pattern, and in screen 221 (FIG. 7f), the apertures consist of hexagonal holes 223 in a square pattern. It is also possible as indicated in screen 229 (FIG. 7g) that the screen be composed of a distribution of wires which may be woven into a mesh as indicated in FIG. 7h) in which wires 231 and 233 are interwoven to provide a woven wire screen.

Figure 7I:
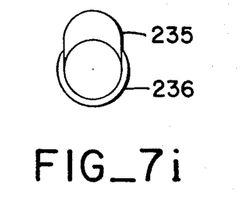

In the event of a woven wire screen comprised of wire of circular cross section, the coating of the entire surfaces of the screen is accomplished in the manner indicated in FIG. 7i. Thus, the ordinary insulative material is coated in a layer 236 around a major portion of the circumference of the wire so that it covers the portions comprising one surface of the screen and the walls defining the aperture holes through the screen. The photoconductive material is coated in a layer 235 around a minor portion of the circumference of the screen covering the portions comprising the opposite surface of the screen. As explained hereinafter, a significant improvement in the capability of the screen in acquiring and retaining charge results because all of the metal or conductive portions are covered with insulative material. In the various configurations shown in FIGS. 7a through 7h the coating of the etched screens can be improved if the corners of the screen are abraded or otherwise rounded before coating.

Figure 5A:
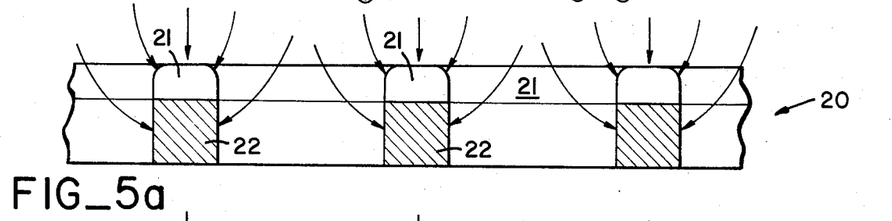
FIGS. 5a and 5b are end cross-sectional views of a prior art electrostatic screen modulator consisting of a conductive layer and an insulative layer.
Figure 5B:
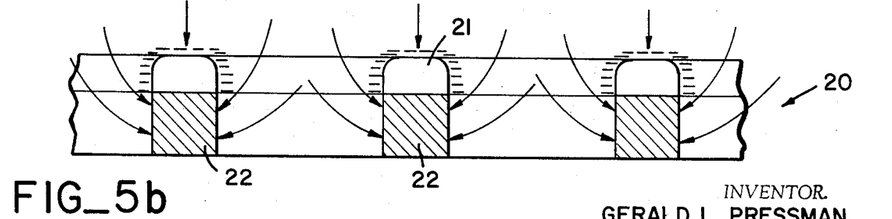

An advantage of the construction of the present invention in addition to the direct positive imaging which it provides resides in the greater charge acceptance capability by the conductive screen base having its surfaces substantially completely coated with insulative material. In the prior art by using square edges, electrostatic screen modulator 20 consisting of an insulative layer 21 and an adjacent conductive layer 22 as illustrated in FIGS. 5a and 5b it has been found that the potentials acquired by the photoconductive material 21 are lower than the potentials acquired by the same material coated to the same thickness on a flat metal plate or plane. For example, a 1.0 mil thick coating of photoconducting insulative material which charges to $-600$ volts on a flat metal plate may only acquire $-150$ volts on an apertured screen of the type illustrated in FIGS. 5a and 5b under identical charging conditions. The reason for this difference is that the exposed metal areas of the conductive layer 22 inside the aperature holes of the screen provide a current path which reduces the corona current flow to the photoconductor layer 21 as shown in FIG. 5. Although the corona charging current flows to all surfaces of the screen initially, a small amount of charge build-up on the photoconductor layer 21 diverts a substantial portion of the corona current flow into the apertures and to the conductive layer as shown in FIG. 5b, whence it is conducted to ground or other fixed potential at which the conductive layer 22 is maintained. The inflow of corona charging current and the outflow of current through the conductive layer 22 eventually stabilizes at a point where the leakage in the photoconductor balances the corona current flow to the photoconductive surface and no further increase in potential is achieved. In the electrostatic modulator screen configurations of FIGS. 1 through 4, however, there is no exposed conductive layer or metal layer to provide a bypass for the corona current flow and the charge quantity and potential acquired by the photoconductive insulator and ordinary insulator layers approaches that of an insulative layer on a flat plate. Because none of the corona current flow is bypassed to ground or other fixed potential, the corona current requirements are greatly reduced and the time required to charge the screen is also reduced.

The improved functioning provided by the electrostatic screen modulator contemplated by the present invention makes it advantageous for use not only in positive imaging but even in negative imaging if desired. Negative imaging is achieved using the type of screen illustrated in FIGS. 1 through 4, for example, by using a toner material of opposite charge than that used for positive printing. Thus, in the examples illustrated in FIGS. 1 through 4 a negatively charged toner particle would be used or, the screen surfaces would be charged with a positive charge similar to the toner particles. In general, if the toner or other charged particles and the screen are given the same sign charge, negative imaging results using the screen contemplated by the present invention. If the toner or other charged particles and screen are given charges of opposite signs, positive imaging results.

Figure 6:
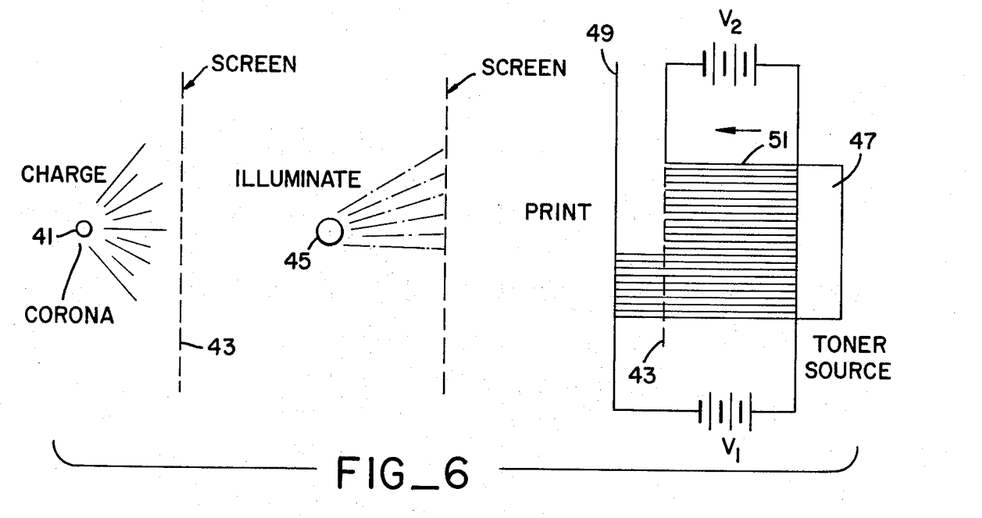
FIG. 6 is a diagrammatic view of an electrostatic printing system.

A positive electrostatic printing system according to the present invention is shown diagrammatically in FIG. 6. An electrostatic screen modulator 43 of the type, for example, illustrated in FIGS. 1 through 4 is initially charged from both sides by means of, for example, corona wand 41 so that a like charge is established over substantially all of the surfaces of screen 43, as heretofore described. The screen 43 can be charged uniformly over all of its surfaces so that there are no fringing fields within the aperture of the screen, or so that a greater quantity of charge is accumulated on the photoconductive side of the screen to establish a uniform charge inequality across the face of the screen and enhancing fringing fields of force within the screen apertures. The screen 43 is thereafter illuminated by a source 45 which displays on the surface of the screen coated with photoconductive insulating material a light pattern corresponding to an image to be reproduced. At the same time, the metallic or other conductive screen core is grounded or maintained at a fixed potential to selectively dissipate the charge deposited on the photoconductive layer in proportion to the intensity of light projected on different portions of the screen. A bipolar electrostatic latent image is thereby established and is supported on the screen and the screen 43 is interposed between a toner source 47 and a back electrode and print-receiving medium 49. The toner source 47 is maintained at a fixed potential for charging the toner particles and an overall accelerating or propulsion field is established between the toner source 47 and back electrode and print-receiving medium 49. The polarities are arranged so that charged toner particles from source 47 are accelerated toward the electrode 49 creating a flow of charged toner particles. The flow of particles is intercepted and modulated by screen 43 interposed in the toner flow path. The unilluminated portions of screen 43 corresponding to the dark portions of a pattern to be reproduced are passive to the flow of tone particles having a charge opposite that on the screen or enhance the flow of toner particles permitting deposition of dark toner particles on print-receiving medium 49 corresponding to the dark areas of a pattern to be reproduced. On the other hand, the illuminated portions of screen 43 corresponding to the light portions of an image to be reproduced block the passage of dark toner particles to varying degrees resulting in light areas on print-receiving medium 49 corresponding to the light areas of an image to be reproduced. The fringing fields established within the apertures of screen 43 in fact vary in strength and polarity from blocking to enhancing and over a continuous range in between to permit continuous tone positive reproduction with continuous gray scale. Thus, the system achieves direct positive electrostatic printing.

The electrostatic screen modulator of the present invention is applicable not only for controlling the flow of charged toner particles or droplets or other printing material, but also for controlling the flow of charged particles generally. For example, the modulator can be utilized for controlling a flow of ions as set forth in U.S. Pat. application Ser. No. 709,578, filed on Mar. 1, 1968, now U.S. Pat. 3,645,614 and entitled "Aperture-Controlled Electrostatic Printing System and Method Employing Ion Projection."

Figure 8:
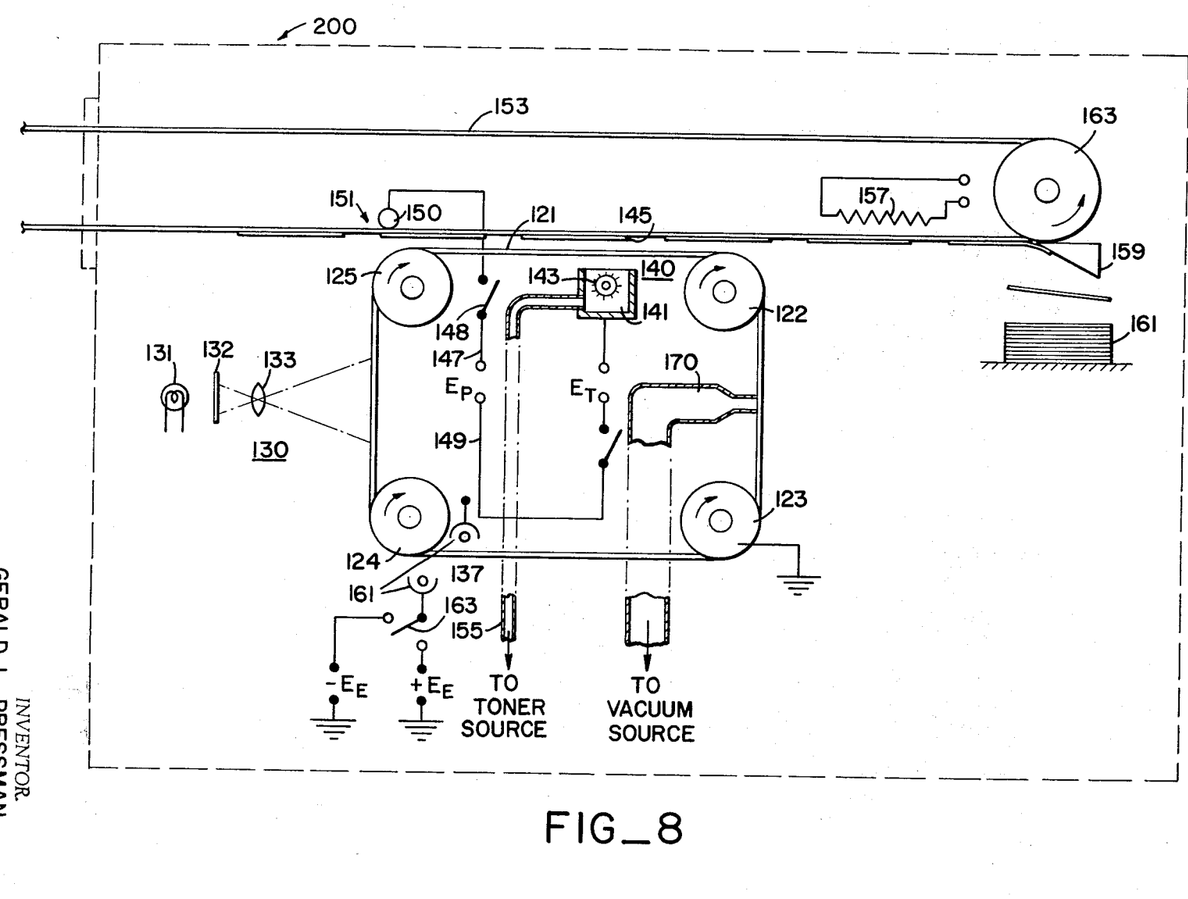
FIG. 8 is a diagrammatic view of an electrostatic printer.

An electrostatic printing system incorporating an electrostatic screen modulator of the type illustrated in FIGS. 1 through 5 but in the form of an endless web or belt 121 is shown in FIG. 8. The screen 121 is supported by four motor-driven drums 122 through 125 and is oriented with the surface of the screen coated with photoconductive insulating material facing outward. As the endless screen 121 is driven by the supporting drums a corona discharge spray emanating from sources 161 on each side of the screen charges the screen with like charges over substantially its entire surfaces. If the outwardly facing photoconductive insulator layer has a greater charge capacity than the ordinary insulative layer coated on the inner surface of the screen and on the walls defining the apertures through the screen, then a uniform chargre inequality established across the face of the screen produces uniform enhancing fields within the apertures of the screen as heretofore described. The surfaces of screen 121 can be charged either positively or negatively by means of switch 163 which controls the polarity of the potential source simultaneously applied to the corona spray sources 161 positioned on each side of screen 121.

The screen is next positioned before an imaging station generally designated 130 which includes a light source 131, transparency or other image pattern to be projected 132, and lens system 133 which directs light in the pattern of the image to be reproduced onto the outer surface of screen 121. The conductive metal screen core is exposed, for example, along one side of the endless web for continuous electrical contact with drum 123 which is connected to ground or maintained at a fixed potential. As a result of the light pattern projected on the photoconductive layer of screen 121, the photoconductive insulating material becomes selectively conductive and the uniform charge pattern is selectively dissipated through the conductive metal core leaving a bipolar electrostatic latent image of enhancing, passive and blocking fields of force within the apertures of the screen for controlling a flow of charged particles.

The portion of screen 121 supporting the electrostatic latent image is next positioned at the printing station generally designated 140 which includes a toner supply of charged particles 141 and a back electrode in the form of an endless web 153 intermediate which the screen is positioned. The toner supply 140 is maintained at a toner potential $E_T$ and a revolving brush 143 is provided within the toner supply to agitate the toner material facilitating movement of the toner particles toward screen 121 under influence of an electrostatic accelerating or propulsion field $E_P$ established between the toner supply 141 and the back electrode web 153 on which the printing paper 145 or other printing medium is supported. The propulsion field is derived from source $E_P$ connected by lead 147 and switch 148 to a roller 150 which is in continuous electrical contact with the endless electrode web 153. Web 153 also supports the paper or other printing medium. The source $E_P$ is also connected by lead 149 to the toner supply. The flow of charged particles originating from toner source 141 and accelerated toward the back electrode is intercepted and modulated by the bipolar electrostatic latent image supported on screen 121 and a modulated flow of particles comes to rest on a paper 145 or other printing medium positioned at the printing station in a pattern corresponding to the image to be reproduced. The paper 145 on which charged particles in the desired pattern adhere is transferred by web 153 to the heater 157 which fixes the image permanently to the printing medium. The printed sheets are thereafter delivered by means of, for example, wedgde 159 which drops the printed paper onto stack 161. The endless web 153 is driven by a motor driven drum 163 synchronized with the screen 121, with intermittent motion to permit printing at the station 140.

A continuous supply of toner in powdered or atomized form is provided through conduit 155 from a suitable source (not shown). A vacuum scavenger is shown in the form of conduit 170 for removing the toner or other marking particles or droplets from the screen as it passes beyond the printing station for recharging. Switch 148 which controls propulsion field $E_p$ is closed upon arrested motion of the endless screen 121 at printing station 140 and simultaneous arrested motion of the endless web 153 to permit transfer of the toner particles across the air gap between the toner source and back electrode intermediate which screen 121 and its bipolar electrostatic latent image is interposed.

Exposure and printing are preferably carried out with the conveyor intermittently stopped for imaging and printing, although exposure may be accomplished line-by-line fashion on a continuous basis and the printing done intermittently as described above. Similarly, sequential color reproduction can be achieved with the present invention in accordance with the apparatus and method described in United States patent application, Ser. No. 565,284, now U.S. Pat. 3,532,422 entitled Method and Apparatus of Electrostatic Color Reproduction, filed July 14, 1966 and assigned to the same assignee as the present invention, and as set forth in U.S. patent application Ser. No. 800,236, entitled "Method and Apparatus for Aperture Controlled Electrostatic Image Color Reproduction or Constitution," filed Feb. 18, 1968, and assigned to the assignee of the present invention. Furthermore, the apparatus of FIG. 8 is useful for both positive and negative reproductions depending upon the charges applied to the screen 121 and the toner in toner supply 141.

It can be appreciated that the present invention is characterized by an electrostatic modulating screen of sufficient thickness compared to the hole or apertured diameter to permit development of blocking or repulsing fields of force within the holes or apertures which can overcome the overall population field established between the toner supply and back electrode. Electrostatic charge levels for the screen and accelerating fields must therefore be selected accordingly. Furthermore, fringing fields of polarity and strength over a continuous range from enhancing to blocking can be established within the apertures of the modulating screen to permit continuous tone gray-scale and color printing.

When using photosensitive and photoconductive insulating materials in the components of the system in FIG. 8, a light tight box indicated by dotted line 200 is employed with suitable ingress and egress openings.

It has been found that the preferred gap for transferring charged toner or other marking material or droplets between the electrostatic flow modulating screen and the print-receiving paper is in the order of 1/16 to 1/4 of an inch but it is to be noted that contact printing can also be achieved with the process of the present invention. Toner particles as large as 20 microns have been found to be operative in a system of the present invention and to provide good quality printing. Even smaller sizes, however, are, of course, preferred. Dielectric materials for the screen can be selected from any of a number of suitable dielectrics, such as plastic, quartz, and many others.

Figure 9:
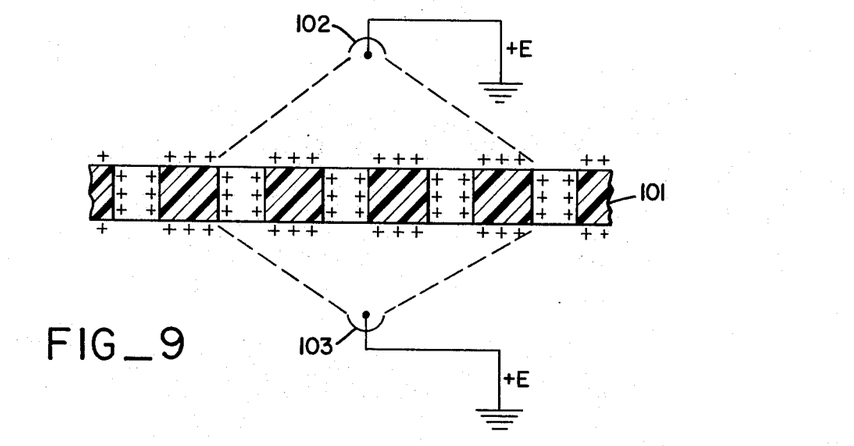
FIG. 9 is a diagrammatic cross-sectional view of another electrostatic screen modulator.
Figure 10:
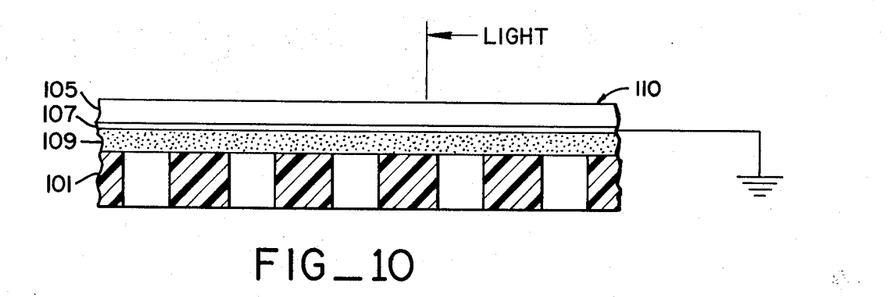
FIGS. 10 and 11 are diagrammatic views showing one technique for establishing a bipolar electrostatic latent image.
Figure 11:
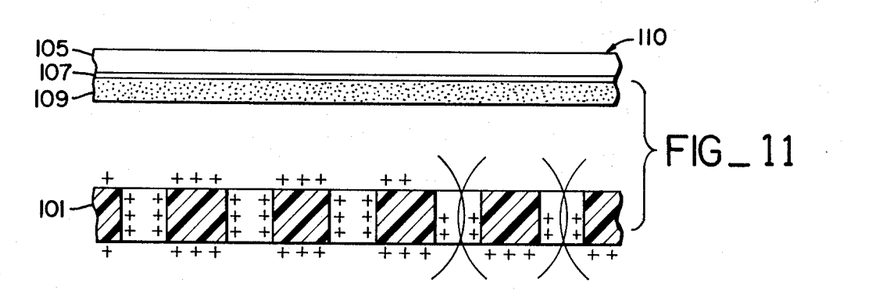
Figure 12:
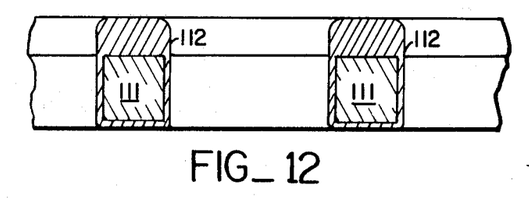
FIG. 12 is a fragmentary cross-sectional view of another electrostatic screen modulator.

An electrostatic screen modulator formed entirely of insulative dielectric material is shown in FIG. 9. According to this embodiment of the invention, there is provided an apertured screen 101 formed entirely of a dielectric material. Alternately, the screen can be formed with a metal base 111 coated on all surfaces with a dielectric material 112 which can be thicker on one side to permit development of a uniform charge inequality or potential difference through the screen apertures upon charging of the surfaces. A fragment of such a screen is shown in FIG. 12. The screen 101 is charged over substantially the entire surfaces including both sides of the screen and the wall defining the aperture thereof with like charges from corona sources 102 and 103. In the example shown, the corona spray sources are connected to positive potentials for depositing positive charges over the surfaces of the screen. The charges deposited along one surface or side of the screen are thereafter selectively dissipated by one of the contact discharging techniques described in U.S. patent application Ser. No. 673,499, referred to above, and illustrated by way of example in FIG. 10 hereof. As shown in that figure, selective discharge of the charges deposited along one surface of screen 101 is accomplished by using a multilayered discharge plate 110 consisting of a transparent support 105, a transparent conductor laper 107, and a layer 109 of photoconductive insulating material. The dicharge plate 110 is placed in contact with screen 101 along one side so that the photoconductor layer 109 is in contact with the dielectric material of the screen. A light image corresponding to a pattern to be reproduced is projected through the transparent layers 105 and 107 onto the photoconductive insulative layer 109. At the same time, the transparent conducting layer 107 is connected to a ground potential or other desired fixed potential for selectively neutralizing the charge initially uniformly distributed across the screen 101. After a bipolar electrostatic latent image is established across screen 101 the discharge plate 110 is removed leaving the screen 101 on which the electrostatic latent image is supported. The result of the charging operation in FIG. 10 on the screen of FIG. 9 is illustrated in FIG. 11. As heretofore described, the bipolar electrostatic latent image comprises fringing fields within the apertures of the screen for selectively blocking and passing a flow of charged particles directed through the screen. Screen 101 is thereafter incorporated in a system such as that diagrammatically set forth in FIG. 6 for modulating a flow of charge particles.

Direct contact charging methods for establishing an electrostatic latent image as set forth in U.S. patent applications Ser. No. 673,499 and Ser. No. 776,146, referred to above can also be applied to the various screen modulators of the present invention. Thus, instead of selectively dissipating an initially uniformly established charge layer, one surface of the screen modulator can be directly selectively charged by transferring an electrostatic latent image to the surface, using the contact charging methods. A uniform charge layer is established over the opposite surface of the screen modulator to provide a bipolar electrostatic latent image.

It is apparent that a variety of other dielectric screen configurations can be formed according to the present invention. Thus, the screen of FIG. 9 could be formed of adjacent layers of dielectric materials of different charge storage capacity for initially establishing a uniform charge inequality across the face of the screen and therefore enhancing fields within the apertures of the screen as heretofore described.

By way of example a particular apertured screen electrostatic modulator used successfully according to the present invention is here set forth. A stainless steel etched screen base was formed having a thickness of 1.5 mils and 5.5 mil diameter holes spaced at 1.5 mils apart edge to edge. The base was coated with an insulator coating of plastic polymer 0.2 mil thick on one side face of the screen and in the walls of the apertures. A photoconductor coating of cadmium sulphide dispersed in a plastic binder was coated on the other side face of the screen to a thickness of 1.0 mil. The photoconductor layer was charged electrostatically to a potential of 400 volts relative to a zero ground potential applied to the metal screen base. The insulator layer on the other side of the screen was charged to a 200 volt potential relative to the base. This particular screen had an open area ratio, i.e. a ratio of hole area to the screen area of approximately 65%.

With reference to the screen parameters it has been found that a ratio of photoconductor thickness to hole diameter in the range of .2 to .5 mil provides optimum results. This also applies when an insulating material is applied on both sides of the screen with a uniform greater thickness on one side of the screen. In that instance the preferred range .2 to .5 applies to the ratio of the coating thickness on the thicker side to hole diameter. It has also been found that an open area ratio in the range of 50–70% is preferable.

What is claimed is:

1. A screen for modulated aperture electrostatic printing comprising:
   a conductive screen base formed with an array of apertures therethrough, a coating of insulative material over one face of the conductive screen base and the inner surfaces of said apertures, and a coating of photoconductive insulating material over the other face of the conductive base whereby the surfaces of said conductive screen base are substantially unexposed, said screen and coatings constructed and arranged to provide holes through the screen apertures, said photoconductive insulating layer formed to a thickness greater than said insulative layer sufficient to support a charge layer on one face of the screen of greater charge than the other face of the screen for establishing a uniform charge inequality and consequent electric fields of uniform magnitude and orientation through the screen apertures between the photoconductive layer on one face of the screen and the insulative layer on the other face.

2. An electrostatic multilayered screen modulator comprising:
a conductive apertured screen having a layer of insulative material coated on one face thereof and on the inner surfaces defining said screen apertures and having a layer of photoconductive insulating material coated on the other face thereof, said multilayered screen and coated layers constructed and arranged to provide holes through the screen apertures, said photoconductive layer formed with a thickness greater than said insulative layer sufficient to support a uniform charge distribution greater on one face of the screen than the other for establishing electrical lines of force of selected magnitude and orientation within the screen apertures between the photoconductive layer on one face of the screen and the insulative layer on the other face.

3. A method for modulating a flow of charged particles using an apertured screen having all its surfaces formed of an insulative material formed to a predetermined thickness on the first face of the screen greater than on the second face comprising:
establishing like charges over the entire surfaces of said screen and distributing said charges in greater quantity on the first face than on the second thereby providing a uniform charge inequality between the faces of the screen with electric fields of substantially uniform magnitude and orientation extending within the screen apertures between the first and second faces;
selectively dissipating the distributed charges over the first face of the screen in accordance with a pattern to be reproduced thereby selectively reducing, cancelling and reversing electric fields extending within the apertures;
and directing the flow of charged particles through the screen apertures for selectively enhancing, passing and blocking the flow of particles in accordance with the pattern.

4. The method of claim 3 wherein the selective dissipating is caused by a pattern of light and the insulative material on the first face comprises a photoconductive insulating material.

5. The method of claim 4 wherein the quantity of light in said pattern is sufficient to reduce the heavier charges on the one side to lesser charges than on the other side at selected locations.

6. A method for modulating a flow of charged particles using an apertured screen having all its surfaces formed of an insulative material formed to a predetermined thickness on the first face of the screen greater than on the second face comprising:
establishing and distributing like charges over the entire surfaces of the screen, and concentrating the charges to a greater potential on the first face of the screen than the other thereby creating a uniform charge inequality across the screen with electric fields of uniform magnitude and orientation extending through the apertures between the faces of the screen;
orienting said screen and electric fields to enhance a flow of charged particles of predetermined charge directed through the screen apertures;
selectively dissipating the distributed charges over the face of the screen having the greater potential in accordance with a pattern to be reproduced for selectively reducing, neutralizing and reversing the electric fields within the apertures;
and directing the flow of charged particles through the screen thereby selectively enhancing passing and blocking the flow of particles in accordance with the pattern.

7. A method for controlling the cross-sectional density of a stream of charged particles accelerated between a pair of electrodes through an apertured screen comprising:
establishing charge layers of different potential on the opposite faces of said screen thereby providing a coplanar array of a plurality of bipolar electrostatic fields extending within the screen apertures between the faces of the screen, positioning the screen intermediate the accelerating electrode with lines of force generally parallel to the stream flow and orienting said bipolar electrostatic fields to enhance the stream flow; and
selectively modifying the charge layers for selectively reducing, neutralizing and reversing said bipolar electrostatic fields extending within the screen apertures between the faces of the screen according to a pattern to be reproduced thereby establishing a bipolar electrostatic latent image of a coplanar array of generally parallel fields of selected magnitude and direction within the apertures for selectively enhancing, passing, blocking and thereby modulating the particle stream flow density.

8. A method for controlling a stream of charged particles as set forth in claim 7 wherein the steps of selectively modifying the charge layers for selectively reducing, neutralizing and reversing includes the steps of illuminating the apertured screen with an image to be reproduced and selectively reducing, neutralizing and reversing said bipolar electrostatic fields according to the light intensity on different portions of the array.

References Cited

UNITED STATES PATENTS

| 3,582,206 | 6/1971 | Burdige | 96—1 X |
| 3,339,469 | 9/1967 | McFarlane | 96—1 X |
| 3,532,422 | 10/1970 | McFarlane | 96—1.2 X |
| 3,288,602 | 11/1966 | Snelling et al. | 96—1 X |

FOREIGN PATENTS

| 1,149,901 | 4/1969 | Great Britain | 96—1 X |
| 1,152,308 | 5/1969 | Great Britain | 96—1 X |

GEORGE F. LESMES, Primary Examiner

J. R. MILLER, Assistant Examiner

U.S. Cl. X.R.

96—1.5; 117—201; 346—74 P; 355—3